(12) United States Patent
Glasson

(10) Patent No.: US 6,234,061 B1
(45) Date of Patent: May 22, 2001

(54) PRECISION SENSOR FOR A HYDRAULIC CYLINDER

(75) Inventor: Richard O. Glasson, Whippany, NJ (US)

(73) Assignee: Control Products, Inc., East Hanover, NJ (US)

( * ) Notice: Subject to any disclaimer, the term of this patent is extended or adjusted under 35 U.S.C. 154(b) by 0 days.

(21) Appl. No.: 09/302,701

(22) Filed: Apr. 30, 1999

Related U.S. Application Data

(60) Provisional application No. 60/104,866, filed on Oct. 19, 1998.

(51) Int. Cl.[7] .................................................. F01B 31/12
(52) U.S. Cl. ................................................ 92/5 R; 33/763
(58) Field of Search ...................... 91/1; 92/5 R; 33/756, 33/759, 761, 762, 763

(56) References Cited

U.S. PATENT DOCUMENTS

| | | | |
|---|---|---|---|
| 3,403,365 | * 9/1968 | Richards | 92/5 R |
| 4,121,504 | 10/1978 | Nowak | 92/5 R |
| 4,231,700 | 11/1980 | Studebaker . | |
| 4,286,386 | * 9/1981 | Long | 33/759 |
| 4,288,196 | 9/1981 | Sutton, II . | |
| 4,319,864 | 3/1982 | Kaufeldt . | |
| 4,386,552 | * 6/1983 | Foxwell | 92/5 R |
| 4,945,221 | 7/1990 | Nielsen et al. . | |
| 4,989,329 | 2/1991 | Pullen . | |
| 5,024,250 | * 6/1991 | Nakamura | 92/5 R |
| 5,341,724 | * 8/1994 | Vatel | 92/5 R |
| 5,404,661 | 4/1995 | Sahm et al. . | |
| 5,694,042 | 12/1997 | Eaton . | |
| 5,701,793 | 12/1997 | Gardner . | |
| 5,752,811 | 5/1998 | Petro . | |

FOREIGN PATENT DOCUMENTS

| | | |
|---|---|---|
| 26 35 614 | 2/1978 | (DE) . |
| 38 35 782 | 4/1990 | (DE) . |
| 0325787 | 8/1989 | (EP) . |
| 0505297 | 9/1992 | (EP) . |

OTHER PUBLICATIONS

Murakami, T., M. Kato and M. Ota, "Precision Angle Sensor Unit for Construction Machinery," SAE Technical Paper Series 972782, Sep. 1997.

* cited by examiner

Primary Examiner—F. Daniel Lopez
(74) Attorney, Agent, or Firm—Gibbons, Del Deo, Dolan, Griffinger & Vecchione

(57) ABSTRACT

A sensor mountable within a hydraulic cylinder provides a precision signal indicative of the position of the piston utilizing a non-contacting electromechanical transducer. The sensor includes a flexible connector attached between the cylinder piston and a converting element for sensing the displacement of the cylinder piston. The converting element comprises a pick-up spool coupled to the other end of the connector and rotatable about an axis. The spool is under tension from a spring coupled to the spool. A lead screw engages threads on the interior of the spool, and translates along an axis when the spool rotates. A transducer is disposed to sense the position of the lead screw, and provides an output signal proportional to the motion or position of the movable element. The transducer may be an LVDT or other non-contacting transducer.

13 Claims, 9 Drawing Sheets

PRECISION SENSOR FOR A HYDRAULIC CYLINDER

RELATED APPLICATIONS

This application claims the benefit of United States Provisional Application Ser. No. 60/104,866, filed on Oct. 19, 1998.

FIELD OF THE INVENTION

The invention generally relates to position sensors, and more particularly to linear position sensors for use on power cylinders.

BACKGROUND

Equipment implementing hydraulic cylinders for mechanical movement, such as excavators and other heavy construction equipment, depend upon operators to manually control the moveable elements of the equipment. The operator must manually move control levers to open and close hydraulic valves that direct pressurized fluid to hydraulic cylinders. For example, when the operator lifts a lift arm, the operator actually moves a lever associated with the lift arm, causing a valve to release pressurized fluid to the lift arm cylinder. The use of levers to control hydraulic equipment depends upon manual dexterity and requires great skill. Improperly operated equipment poses a safety hazard, and operators have been known to damage overhead utility wires, underground wiring, water mains, and underground gas lines through faulty operation of excavators, bucket loaders or like equipment.

In addition to the safety hazards caused by improperly operated equipment, the machine's operating efficiency is also a function of the operator's skill. An inexperienced or unskilled operator typically fails to achieve the optimum performance levels of the equipment. For instance, the operator may not consistently apply the force necessary for peak performance due to a concern over striking a hazard. Efficiency is also compromised when the operator fails to drive a cylinder smoothly. The operator alternately overdrives or underdrives the cylinder, resulting in abrupt starts and stops of the moveable element and thereby derating system performance. As a result, the skill level necessary to properly and safely operate heavy equipment is typically imparted through long and costly training courses and apprenticeships.

There have been various attempts at implementing an automated control system for use on heavy equipment. One such system is disclosed in U.S. Pat. No. 4,288,196. The system described therein provides for a computer programmable system for setting the lowermost point of a backhoe bucket. In U.S. Pat. No. 4,945,221, a control system for an excavator is disclosed. The system attempts to control the position of the bucket cutting edge to a desired depth. Another position locating system for heavy equipment is disclosed in U.S. Pat. No. 5,404,661.

These systems and others like them share a common feature in that they implement a position sensor. Typically, these sensors are rotary potentiometers as, for instance, suggested in Murakmi, Kato and Ota, *Precision Angle Sensor Unit for Construction Machinery*, SAE Technical Paper Series 972782, 1997. This sensor relies upon a potentiometer which changes a voltage or current in relation to the position of a bucket or boom. Other types of sensors rely upon optical, conductive plastic, or metal-in-glass technologies.

It is a disadvantage of these sensors that they mount to the outside of the machinery, thereby exposing them to the environment. In the case of heavy equipment, this environment includes severe temperatures, excessive moisture, and air-borne particulate matter which may infect the sensor. In the case of optical, conductive plastic and metal-in-glass technologies, the sensors would rapidly degrade if used on construction equipment. Furthermore, some of these sensors use contacting components that are susceptible to wear, vibration and temperature. As a result, no sensor mountable to the outside of heavy equipment or relying upon contacting elements has gained widespread use in the industry.

There have been attempts to overcome the limitations of contacting sensors by using electromagnetic energy. For example, the system disclosed in U.S. Pat. No. 4,945,221 discloses using lasers for sensing position. Others suggest using RF energy or the like to provide a feedback signal. These systems, however, have not replaced the less expensive potentiometers due to their complexity of use and their expense.

As the demands placed upon actuated machinery increases, so does the demand for a low cost, long-life sensor operable in a harsh environment. Despite the development of highly sophisticated control systems, computer processors and application specific software, the implementation of this technology in electrohydraulic equipment has been curtailed by the failure to provide a long-life, cost-effective precision sensor operable in harsh environments.

SUMMARY OF THE INVENTION

A sensor according to the principles of the invention provides a precision signal utilizing a non-contacting transducer. In an exemplary embodiment, the sensor mounts inside a hydraulic cylinder, away from the harsh environment, and provides a voltage or current signal indicative of the position of the piston. The sensor provides a connector, attached between a cylinder piston and a converting element, for sensing the displacement of the piston. The converting element converts the cylinder displacement to a proportional displacement of a translating member. A precision transducer senses the displacement of the translating member and provides an electrical output signal proportional to the piston movement or to the piston's position.

In one exemplary sensor according to the principles of the invention, a flexible connector such as a cable is attached to the movable element (a piston). The converting element comprises a pick-up spool coupled to the other end of the connector and rotatable about an axis. The spool is under tension from a recoil mechanism, such as a spring, coupled to the spool. A translating member, which can be a lead screw, engages threads on the interior of the spool, and translates along an axis when the spool rotates. A transducer is disposed to sense a position or motion of the translating member, and provides an output signal proportional to, and therefore indicative of, the position (or motion) of the translating member. The transducer can be a linear variable differential transformer (LVDT), which is a non-contacting transducer. Of course, other transducers, including those using contacting components, can be used.

For use in a hydraulic cylinder, the sensor's operation is like this. The converting element is attached to a cylinder end cap. As the cylinder piston moves within the cylinder, the spool feeds out or draws in cable, thereby tracking the piston's linear displacement. As the cylinder moves toward the spool, the spring causes the spool to wind the cable.

When the cylinder moves away from the spool, the cylinder force overcomes the spring tension and pulls cable off the spool. The spool is in threaded engagement with a lead screw. As the spool rotates, the spool and lead screw convert the rotary motion of the spool to a linear displacement of the lead screw. The displacement is proportional to the piston displacement. The lead screw is attached to an LVDT core that moves within an LVDT body when the cylinder moves. The LVDT delivers an electrical signal at its output, which can be configured as a position signal, rate signal or the like.

BRIEF DESCRIPTION OF THE DRAWINGS

A more complete understanding of the invention may be obtained from consideration of the following description in conjunction with the drawings in which.

DETAILED DESCRIPTION

A feedback sensor for a cylinder according to the principles of the invention provides a precision signal indicative of a piston position with relation to a cylinder. The sensor is durable, maintains a long life, and is configured for use in harsh environments. An exemplary sensor mounts inside a hydraulic cylinder, thereby protecting the sensor, and uses a non-contacting transducer to provide the precision signal. A converting element converts the motion of the piston to a proportional motion of a translating member. The transducer, which can be located remotely from the piston, senses the position of the translating member, and provides an electrical output signal indicating the piston's position. This signal can be conditioned and used in a feedback control system, a user interface, or any system where such a signal is desirable.

Figure 1:
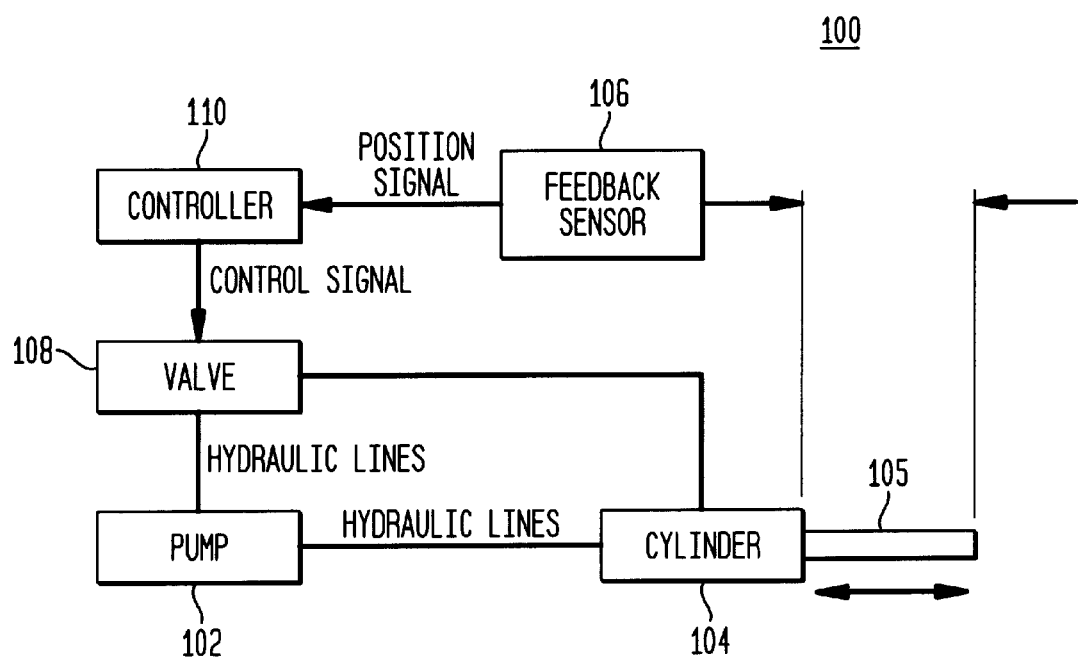
FIG. 1 is a block diagram of an exemplary feedback control system for a hydraulic cylinder.

In FIG. 1, a block diagram of an exemplary feedback control system 100 is shown. The control system 100 comprises a hydraulic cylinder 104 actuated by a pump 102 and a valve 108. As is known in the art, the pump 102 delivers hydraulic fluid under pressure to the cylinder 104 which forces the piston 105 to move with respect to the cylinder. The valve 108 controls the flow of hydraulic fluid to the cylinder 104. To implement feedback control, a feedback sensor 106 senses the position of the piston 105 and delivers a position signal to a controller 110. The controller 110 actuates the valve 108 according to certain instructions. The piston 105 may be attached to some other apparatus (not shown) whereby a displacement of the piston causes a displacement of the apparatus. Although a hydraulic cylinder is shown, it should be apparent that other types of cylinders, such as pneumatic cylinders, can be used.

Figure 2:
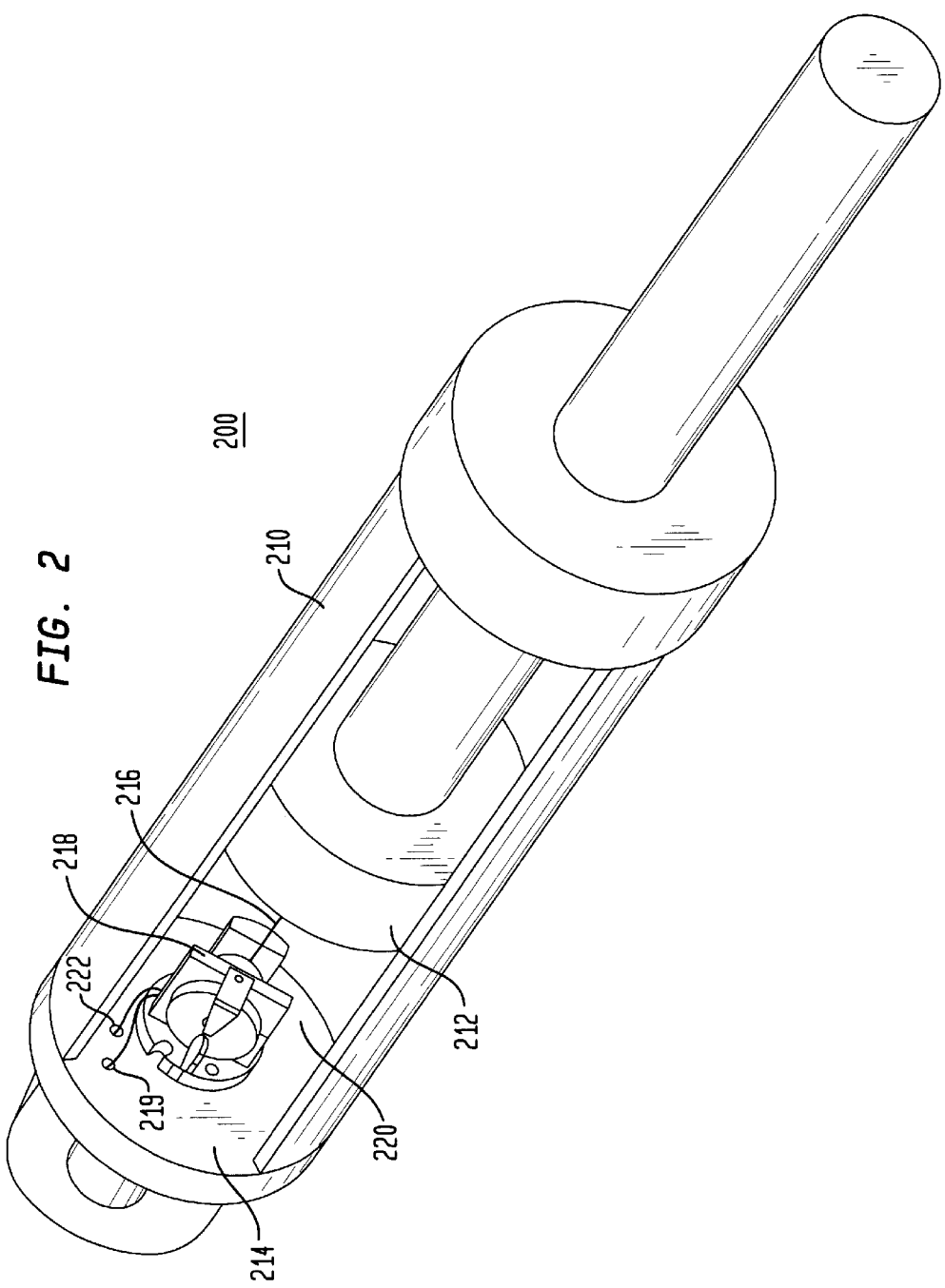
FIG. 2 shows a perspective of an exemplary cylinder according to the principles of the invention.

Referring to FIG. 2, a hydraulic cylinder 200 that can be used in the feedback control system 100 of FIG. 1 is shown. The hydraulic cylinder 200 comprises a cylinder enclosure 210 and a piston 212. The piston 212 is operable to translate in dependence upon hydraulic fluid pumped into the cylinder. The cylinder enclosure 210 further includes a base 214, and the piston 212 is a moveable element with respect to the base. A precision sensor 218 provides a position related signal across the terminals 219 and 222. For instance, the sensor delivers a signal across the sensor's terminals indicative of the position "d" in FIG. 2. A high pressure bulkhead connector (not shown) provides a mechanism for routing the terminals 219 and 222 to the outside of the cylinder enclosure 210. The sensor 218 further comprises a flexible connector 216 attached to the piston 212, a converting element 220 attached to the base 214 and a transducer (not shown). The connector 216 also attaches to the converting element 220 and directly imparts the displacement of the piston 212 with respect to the base 214 to the converting element 220. The converting element 220 converts this displacement to a proportional displacement of a translating member (not shown). The transducer, located remote from the piston, senses the position or motion of the translating member.

Figure 3A:
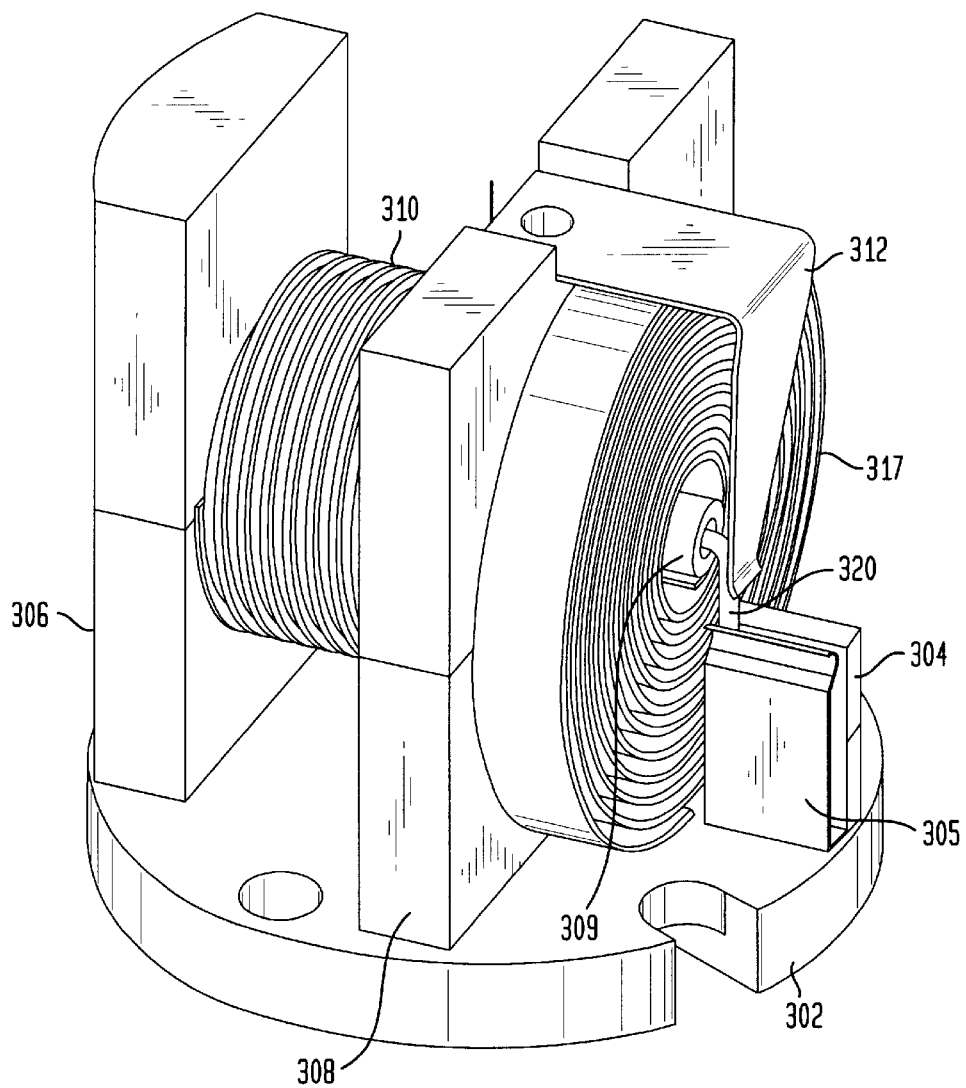
FIGS. 3A, B and C show an exemplary sensor according to the principles of the invention.

An exemplary embodiment of the converting element 220 is described with reference to FIGS. 3A, 3B and 3C. A first mounting element 302 is provided for attaching the converting element 220 to, for instance, the base of the hydraulic cylinder. A second mounting element 306 and a third mounting element 308 are fixedly attached to the first mounting element 302. The converting element 220 includes a rotating element 310 rotatably attached between the second mounting element 306 and the third mounting element 308. An anti-backlash spring 312 is mounted to the third mounting element 308. A block 304 and an anti-rotation spring 305 are attached to the first mounting element 302. An arm 320 attaches to a translating member 324 at one end and engages the block 304 at the other. A spring 317 for providing a rotary mechanism for the rotating element 310 is housed in a spring housing or spring mounting (not shown). The housing is attached to the first mounting element 302.

Figure 3B:
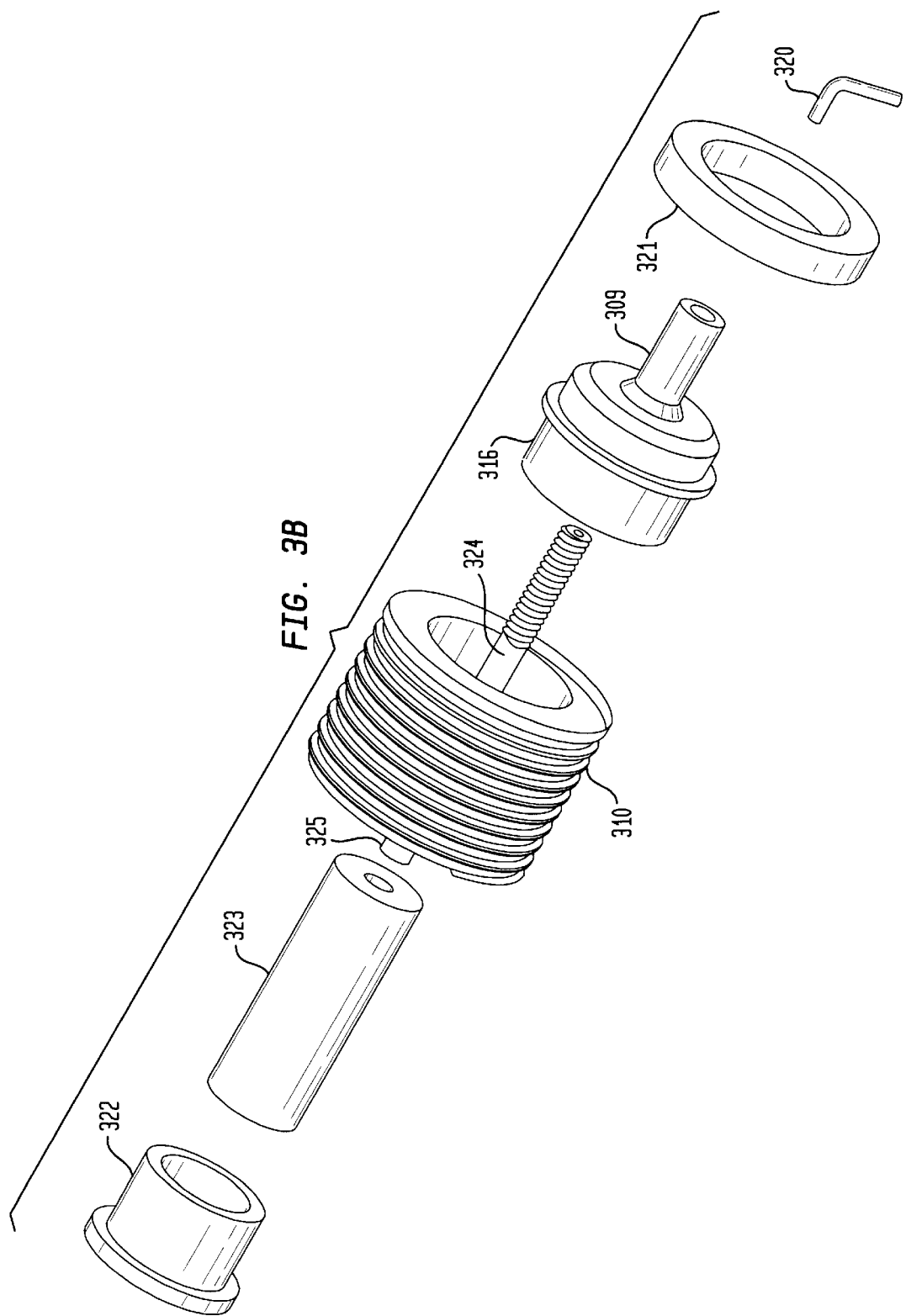
Figure 3C:
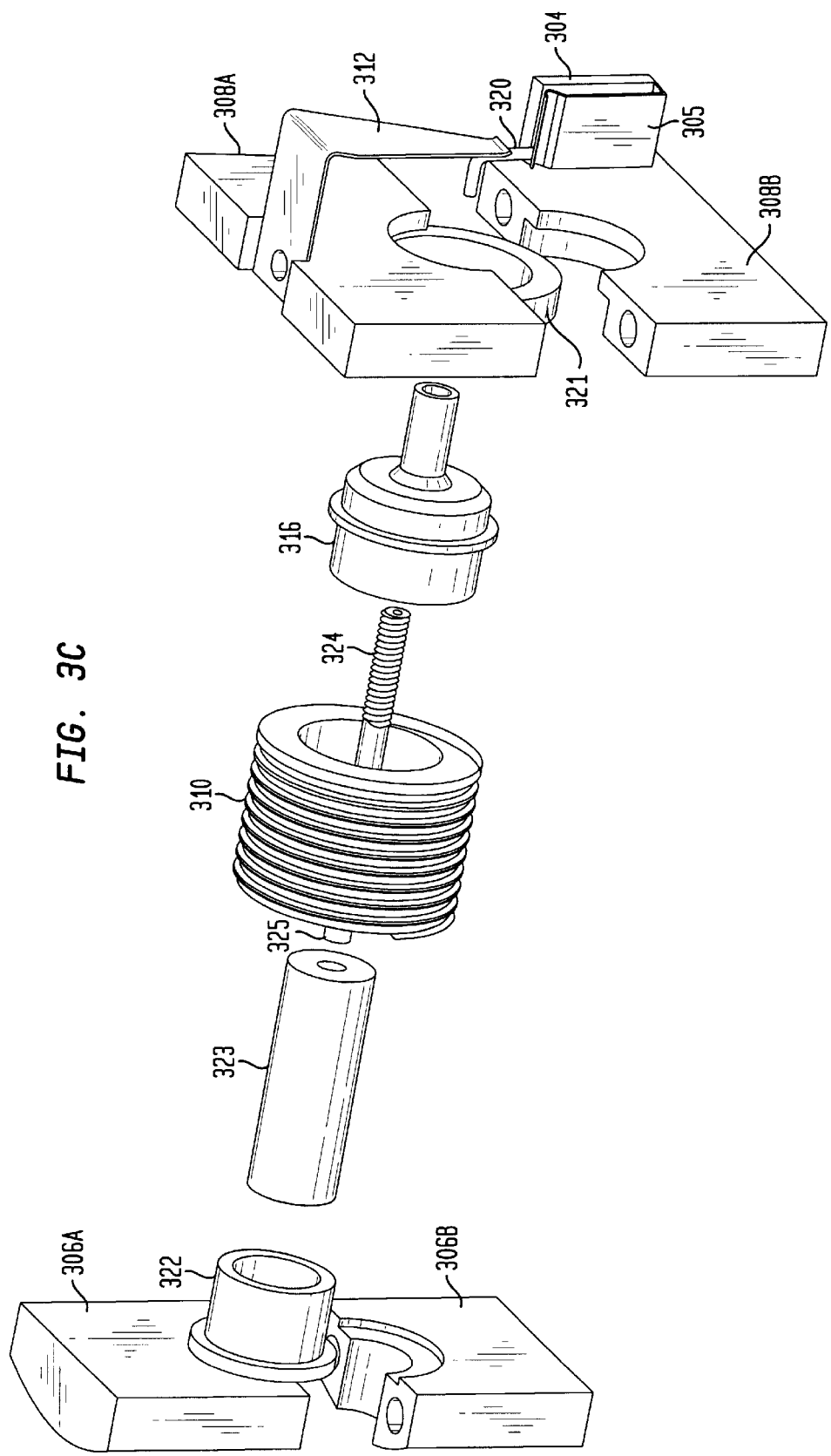

In FIGS. 3B and 3C an exploded view of the converting element 218 is shown. A press-in hub 316 having a shaft 309 with internal threads is rotatably attached to a bushing 321. The bushing is fixedly attached to the third mounting element 308. For ease of installation, the third mounting element can comprise an upper half 308A and a lower half 308B. The translating member 324, having threads formed thereon, engages the internal threads of the hub 316. The rotating element 310 defines an internal opening into which the hub is pressed so that it rotates as the rotating element 310 rotates. On a side opposite the hub 316, a bushing 322 fixedly mounts in the second mounting element 306 which can also comprise an upper half 306A and a lower half 306B. As shown in FIG. 3C, the brackets 306 and 308 define a circular opening for attaching the bushings 322 and 321, respectively. An axle 323 attaches to the bushing 322, and the rotating element 310 rotatably engages the bushing 322. In this exemplary embodiment, the transducer is a linear variable differential transformer (LVDT), which has a core and a body. The LVDT body acts as the axle 323. Alternatively, the LVDT body can be internal to a separate axle. The LVDT core 325 is attached to the translating member 324 and disposed to translate within the LVDT body.

Operation of this exemplary sensor is explained with reference to FIGS. 2, 3A, 3B and 3C. The flexible connector 216 attaches to the piston 212 which causes the rotating element 310 to rotate in a first direction when the piston 212 moves away from the cylinder base 214. When the piston travels toward the cylinder base 214, the spring 317 causes the rotating element 310 to rotate in a direction opposite to the rotation caused by the piston moving away from the base 214. In other words, the flexible connector winds around the rotating element 310 when the piston 212 moves toward the base 214, and unwinds from the rotating element 310 when the piston moves away from the base. The linear motion of the piston 212 converts to the angular motion of the rotating element 310 via the pulling action of the piston on the flexible connector and due to the rotational action of the spring 317.

As the rotating element 310 rotates, the hub 316 rotates with it. The hub's internal threads engage threads on the translating member 324. As the rotating element and hub rotate, the threaded engagement causes the translating member 324 to move linearly along the rotational axis of the rotating element 310. The thread arrangement is chosen such that the movement of the translating member is proportional to the movement of the piston. The threads can be acme, square, modified square, buttress, unified, ISO, ball bearing, extra-fine pitch or any other of various known threads. Likewise, the position of the translating member 324 with respect to the transducer is in a one-to-one correspondence with the position of the piston 212. The LVDT 323, 325 senses a position (or a movement) of the translating member and provides a position related signal.

The precision and performance of the sensor is enhanced by providing the previously set forth anti-rotation elements 320, 304 and 305 and anti-backlash elements 320 and 312. When the rotating element 310 rotates, causing the translating member 324 to translate along an axis, there is a small frictional force between the inner threads of the hub and the external threads formed on the translating member. This small frictional force is overcome before the translating member moves. To overcome this force, the arm 320 is provided at an end of the translating member 324. The arm 320 bends substantially perpendicular to a longitudinal axis of the translating member and engages the block 304. For purposes of illustration, the arm 320 is shown engaging the block in FIG. 3A such that, when the rotating element 310 rotates in a counterclockwise direction, the block inhibits the arm 320 from turning, thereby overcoming any frictional force arising from the threaded engagement.

The anti-rotation spring 305 applies a force to the arm such that it engages the block 304 at substantially all times. The force exerted by this spring is perpendicular to the longitudinal axis of the translating member 324 and is chosen such that it overcomes the frictional force caused by the threaded engagement when, with reference to FIG. 3A, the rotating element 310 rotates in a clockwise direction. It should be apparent that various other equivalent structures can be used to inhibit the motion of the arm 320 when the rotating element 310 rotates. For instance, instead of the spring 305, another block can be used. Thus, the arm 320 can be held between two blocks or a slot formed in one block. In any configuration, the anti-rotational forces upon the arm 320 are such that the arm translates when the rotating element 310 rotates.

In addition to the frictional force inherent in the threaded engagement, the tolerances of the threads can introduce a dead space between the threads. For example, when the translating member 324 changes direction, due to a change in the direction of motion of the piston 212, the piston can move some small distance before the threads engage. In other words, depending upon the thread tolerance, there may be play between the threads. This is overcome by the anti-backlash spring 312 attached to the bracket 308. The spring applies a force to the arm 320 directed along the translating member's longitudinal axis. This force holds the translating member in substantially constant threaded engagement with the internal threads of the hub 316. The force exerted by this spring is chosen such that the translating member may move against the spring when the piston displaces to cause such movement.

It should be apparent that various materials and configurations can be used to implement a sensor according to the principles of the invention. For instance, the rotating element 310 can be configured to enhance the performance of the sensor by forming grooves thereon so that the flexible connector 216 winds up along successive grooves of the rotating element 310. In this way, no portion of the flexible connector 216 lies over another portion. Alternatively, wind guides can be used, or for displacements of large magnitude relative to the storage capacity of the rotating element, the rotating element can be configured such that some portions of the flexible connector overlay other portions of the flexible connector.

Likewise, various materials can be used for the flexible connector. A connector made of Kevlar®, and materials like it, provide desirable attributes, including low stretch, tolerance to a hydraulic fluid environment, and stability over a wide range of temperature (low coefficient of thermal expansion). For example, Kevlar® is known to have a coefficient of thermal expansion on the order of –0.000002/ degree Farenheit (–2 parts per million per degree Farenheit). The connector can also comprise other types of cable, such as metallic cable, Nylon®, or stranded cable, and can be coated to provide longer life or to adjust the coefficient of friction. Its diameter can also be adjusted to meet storage needs on the rotating element or to decrease windage. Similarly, the connector can be affixed to the rotating element or moveable element by well-known methods, such as a clevis, pin, weld, bolt or screw, splice, adhesive, threaded terminal, swayed oval, eye, ball and socket, thimble, or a strap fork.

In the embodiment shown in FIGS. 2, 3A, 3B and 3C, the transducer is a linear variable differential transformer (LVDT). It should be apparent to those skilled in the art that other types of transducers can be implemented without departing from the principles of the invention, including differential variable reluctance transducers (DVRTs®), wire wound potentiometers, conductive plastic potentiometers, inductive or capacitive sensors, Hall-effect transducers, or sensors based upon light emitting diodes, or laser light. In each case, the target element for the transducer affixes to the translating member. The sensing element is disposed to sense the motion or position of the target element. Similarly, the rotational spring can be a spiral torsion spring, a volute spring, a constant force extension spring, a helical torsion spring, a twisted elastic element, a round tension or compression spring, a cantilever tension or compression spring or any other type of spring which may be usable to impart a rotational action on the rotating element. Likewise, the arm 320 can also be a pin or other similar structure for engaging the block 304 and the anti-backlash spring 312.

Figure 4:
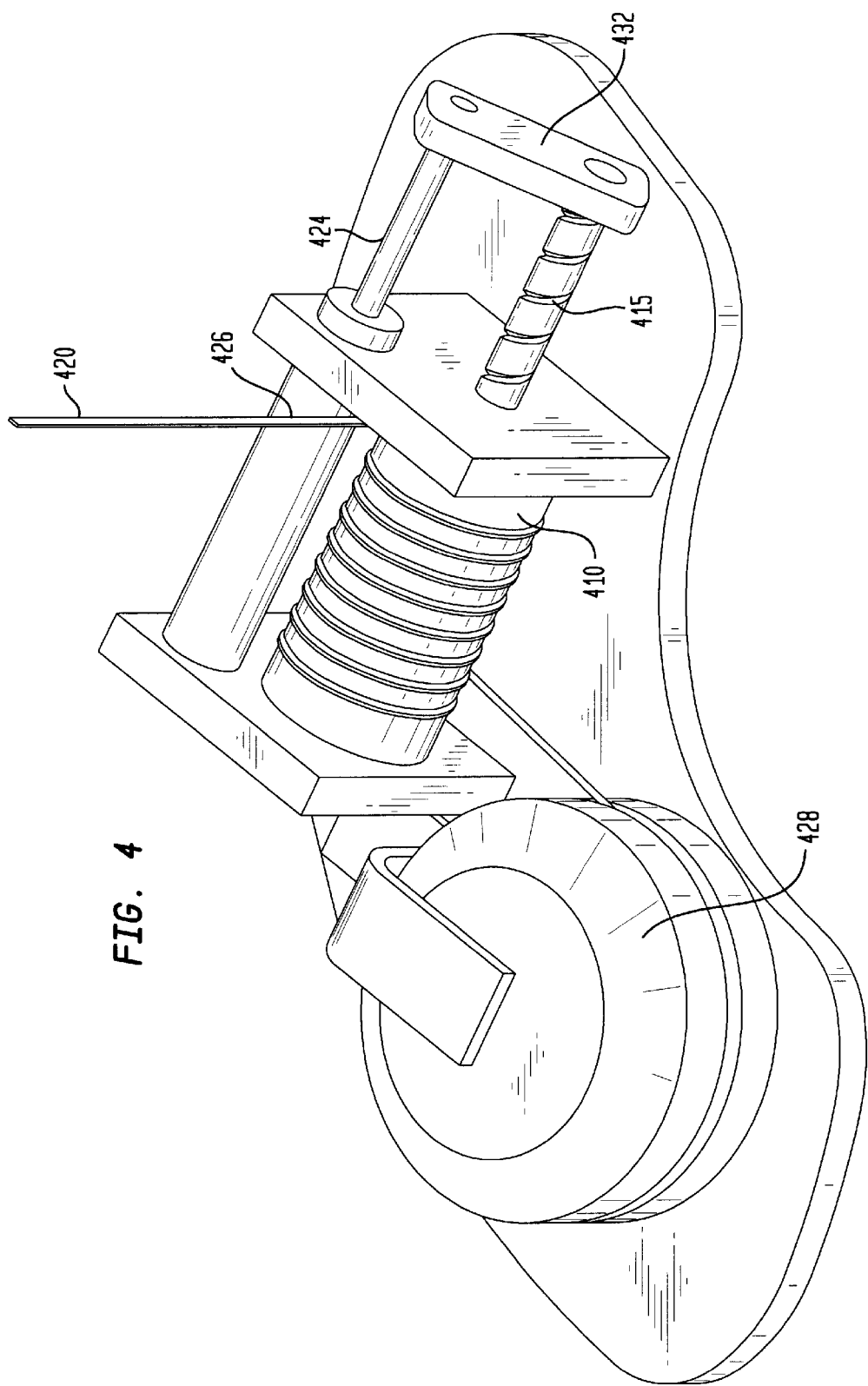
FIG. 4 shows another exemplary sensor according to the principles of the invention.

Another exemplary embodiment of a sensor according to the principles of the invention is shown in FIG. 4. In this embodiment, an LVDT core 424 is caused to translate along an axis substantially parallel to an axis of rotation for a rotating element 410. The flexible connector 420 affixes to the rotating element 410 and to a movable element (not shown). A lead screw 415 threadedly engages the rotating element 410 at one end. At another end, the lead screw is affixed to an arm 422. The LVDT core 424 affixes to the other end of the arm 422 and is disposed to translate in an LVDT body 426. When the flexible connector is pulled such that it unwinds from the rotating element 410, the threaded engagement causes the lead screw 415 to translate. This, in turn, causes the LVDT core 424 to translate within the LVDT body 426. A recoil mechanism 428 causes the rotating element 410 to wind the connector 420 when the moveable element (not shown) moves such that there is no tension on the connector 420. This also causes the LVDT core 424 to translate within the LVDT body 426. The LVDT thereby provides a position related signal for the movable element (not shown).

Figure 5:
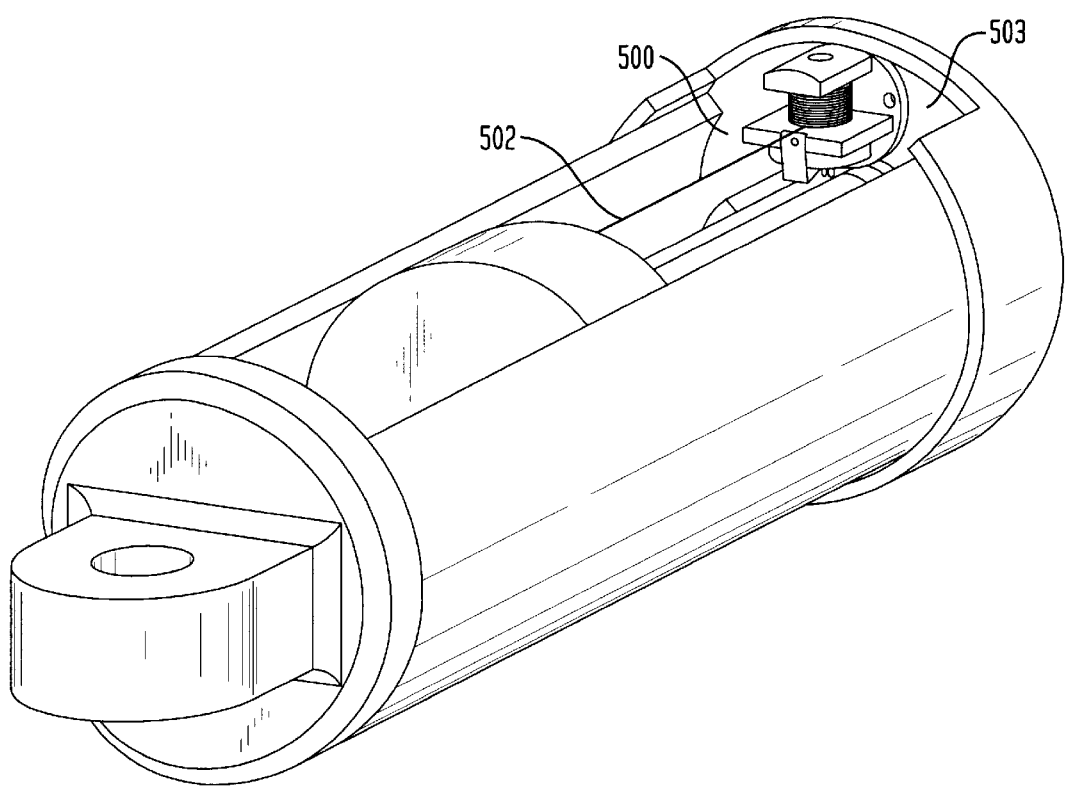
FIG. 5 shows another exemplary sensor according to the principles of the invention.

Of course, the sensor can also be affixed in various locations within a cylinder. For instance in FIG. 5, a sensor 500 is shown attached to the cylinder end cap 503 defining the piston shaft aperture. The flexible connector 502 is affixed to the same side of the piston as the shaft. Operation of this configuration is the same with respect to FIGS. 2, 3A, B, and C.

Figure 6:
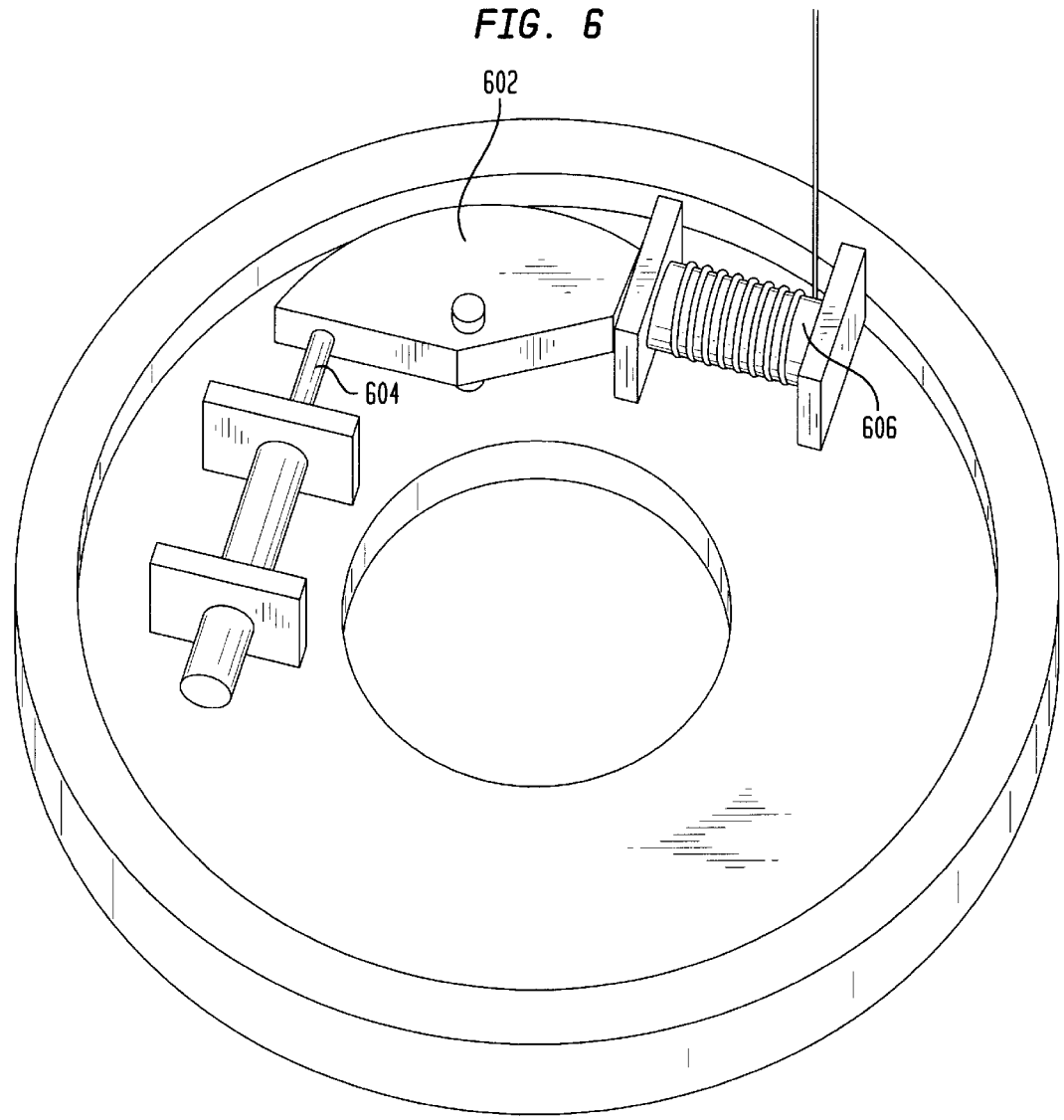
FIG. 6 shows another exemplary sensor according to the principles of the invention; and, FIG. 7 shows another exemplary sensor according to the principles of the invention.
Figure 7:
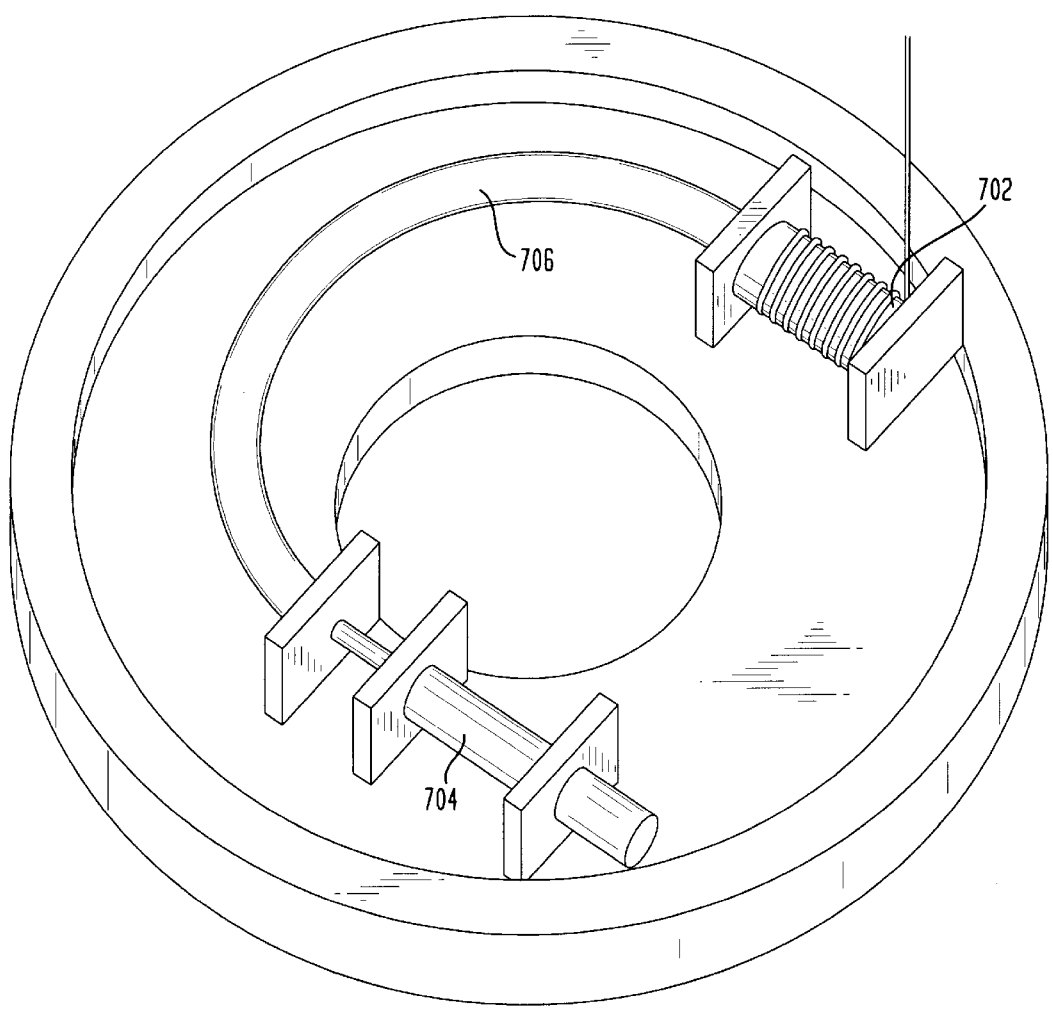

It should also be apparent that various mechanical connections can be made between the transducer and the converting element of the sensor. In FIG. 6, an actuated cam 602 is shown engaged with an LVDT core 604 and with the sensor's converting element 606. In FIG. 7, a mechanical connection between the converting element 702 and the transducer 704 is made via an extension cable 706.

Likewise, the converting element can be configured in various ways without departing from the principles of the invention. For instance, gears instead of threads can convert the linear displacement of the movable element to the linear displacement of the translating member. It should also be apparent that for applications with relatively large displacements of the movable element or where an obstruction is located between the converting element and the movable element, various pulleys, guides or blocks and tackle can be provided to route the connector from the movable element to the sensor's converting element.

It is to be understood that the invention is not limited to the illustrated and described forms of the invention contained herein. It will be apparent to those skilled in the art that various changes may be made without departing from the scope of the invention and the invention is not considered limited to what is shown in the drawings and described in the specification.

What is claimed is:

1. A sensor for providing a position related signal for a first element in relation to a second element, the sensor comprising:
    a flexible connector having a first end attached to the first element;
    a rotating element attached to the second element and coupled to a second end of the flexible connector;
    a translating member in threaded communication with the rotating element, wherein a displacement of the first element causes a displacement of the translating member; and
    a transducer disposed to sense a position of the translating member, wherein the transducer provides the position related signal;
    the sensor further including:
        a mounting element attached in fixed relation to the second element, the rotating element rotatably attached to the mounting element;
        a block attached to the mounting element, the translating member having an arm extending substantially perpendicular to a longitudinal axis of the translating member; and
        an anti-rotational spring attached to the mounting element and engaged with the arm, wherein the anti-rotational spring exerts an anti-rotational force on the arm.

2. The sensor of claim 1 further including an anti-backlash spring attached to the mounting element and disposed to exert an anti-backlash force along the longitudinal axis of the translating member.

3. A sensor for providing a position related signal for a piston in relation to a cylinder, the cylinder having a cylinder bore, the sensor comprising:
    a flexible connector having a first end attached to the piston;
    a rotating element attached to the cylinder and coupled to a second end of the flexible connector;
    a translating member in dependence with the rotating element, wherein a displacement of the piston causes a displacement of the translating member; and
    a transducer disposed to sense the translating member for providing the position related signal,
    the sensor being disposed in the cylinder bore.

4. The sensor of claim 3 further comprising hydraulic fluid contained within the cylinder so that the transducer is exposed to the hydraulic fluid.

5. The sensor of claim 3 wherein said rotating element is a spool having an outer periphery with wind guides.

6. The sensor of claim 3 further including an anti-backlash force exerted along a longitudinal axis of the translating member.

7. The sensor of claim 3 further comprising a recoil mechanism coupled to the rotating element for imparting a rotational action on the rotating element.

8. The sensor of claim 3 wherein the translating, member is in threaded communication with the rotating element.

9. The sensor of claim 3 wherein the translating member displaces along an axis of rotation of the rotating element.

10. The sensor of claim 3 further including a mounting element attached in fixed relation to the cylinder, the rotating element rotatable attached to the mounting element.

11. The sensor of claim 3 further including an anti-rotational force exerted on the translating member.

12. A device comprising:
    a cylinder containing a working fluid;
    a piston slidingly engaged with the cylinder and responsive to the working fluid; and
    a sensor disposed within the cylinder for providing a position related signal, the sensor including:
        a flexible connector having a first end coupled to the piston,
        a rotating element coupled to a second end of the flexible connector;
        a translating member coupled translate in response to rotation of the rotating element, wherein a displacement of the piston causes a displacement of the translating member; and
        a transducer exposed to the working fluid and responsive to the translating member, the transducer providing the position related signal.

13. The system of claim 12 wherein the cylinder is a hydraulic cylinder and the transducer is operable in a hydraulic fluid.

* * * * *

UNITED STATES PATENT AND TRADEMARK OFFICE
CERTIFICATE OF CORRECTION

PATENT NO. : 6,234,061 B1
DATED : May 22, 2001
INVENTOR(S) : Richard O. Glasson

It is certified that error appears in the above-identified patent and that said Letters Patent is hereby corrected as shown below:

<u>Title page,</u>
Item [60], first column under Related U.S. Application Data, please delete "Provisional application No. 60/104,866, filed on Oct. 19, 1998." and insert -- Provisional applicaiton No. 60/104,886, filed on Oct. 20, 1998 --

Signed and Sealed this

Second Day of July, 2002

*Attest:*

*Attesting Officer*

JAMES E. ROGAN
*Director of the United States Patent and Trademark Office*